(12) United States Patent
Sugiura et al.

(10) Patent No.: US 10,780,618 B2
(45) Date of Patent: Sep. 22, 2020

(54) MACHINE TOOL

(71) Applicant: FANUC CORPORATION, Yamanashi (JP)

(72) Inventors: Fuyuki Sugiura, Yamanashi (JP); Koichi Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/004,688

(22) Filed: Jun. 11, 2018

(65) Prior Publication Data

US 2018/0361642 A1 Dec. 20, 2018

(30) Foreign Application Priority Data

Jun. 16, 2017 (JP) ................................. 2017-118404

(51) Int. Cl.
*B29C 45/76* (2006.01)

(52) U.S. Cl.
CPC ...... *B29C 45/76* (2013.01); *B29C 2045/7606* (2013.01); *B29C 2945/76083* (2013.01); *B29C 2945/76093* (2013.01); *B29C 2945/76163* (2013.01); *B29C 2945/76337* (2013.01); *B29C 2945/76943* (2013.01)

(58) Field of Classification Search
CPC .. B29C 2045/7606; B29C 2945/76083; B29C 2945/76093; B29C 2945/76163; B29C 2945/76337; B29C 2945/76943; B29C 45/76; G05B 19/418
USPC .................................... 702/127, 182; 700/94
See application file for complete search history.

(56) References Cited

U.S. PATENT DOCUMENTS

| 5,302,833 | A | * | 4/1994 | Hannan | G01B 11/272 250/231.1 |
|---|---|---|---|---|---|
| 5,338,171 | A | * | 8/1994 | Hayakawa | B29C 45/1747 425/138 |
| 2013/0030558 | A1 | * | 1/2013 | Tezuka | G05B 19/408 700/94 |
| 2017/0277174 | A1 | * | 9/2017 | Maeda | G05B 19/41875 |

FOREIGN PATENT DOCUMENTS

| CN | 101462349 A | 6/2009 |
|---|---|---|
| CN | 202388764 U | 8/2012 |
| JP | H02-211967 A | 8/1990 |
| JP | 04348916 A * | 12/1992 ......... B29C 45/1747 |

(Continued)

OTHER PUBLICATIONS

Yoshinaga et al., "Attitude control device for movable mode in injection molding machine", JP2008265018A English, Publised on Nov. 6, 2008.*

(Continued)

*Primary Examiner* — John H Le
(74) *Attorney, Agent, or Firm* — Studebaker & Brackett PC (57) ABSTRACT

An injection molding machine according to the present invention is a machine tool that includes a measurement unit that measures a predetermined measured value; a calculation unit that calculates attitude accuracy information about the injection molding machine based on the measured value measured by the measurement unit; and a display that displays the attitude accuracy information calculated by the calculation unit together with an overhead view of the injection molding machine.

9 Claims, 7 Drawing Sheets

(56) References Cited

FOREIGN PATENT DOCUMENTS

| | | | | |
|---|---|---|---|---|
| JP | 06190691 | * | 7/1994 | |
| JP | H08-123523 A | | 5/1996 | |
| JP | 2000309037 | * | 11/2000 | ......... B29C 45/1742 |
| JP | 2001047477 | * | 2/2001 | ............ B29C 45/36 |
| JP | 2004-239342 A | | 8/2004 | |
| JP | 2004-345005 A | | 12/2004 | |
| JP | 2005-319537 A | | 11/2005 | |
| JP | 2008265018 | * | 1/2008 | |
| JP | 2012-035553 A | | 2/2012 | |
| WO | 2011/158955 A1 | | 12/2011 | |

OTHER PUBLICATIONS

An Office Action mailed by the Japanese Patent Office dated Dec. 4, 2018, which corresponds to Japanese Patent Application No. 2017-118404 and is related to U.S. Appl. No. 16/004,688.

"Assembly and Adjustment Technology of Mechanical and Electrical Equipment. Mechanical Division", edited by Zhang Guojun, Beijing Polytechnic University Press, Jul. 2012, 1st edition, pp. 248-249, 4.6.2 with the machine translation of the Office Action as a concise explanation of the relevance.

An Office Action mailed by the State Intellectual Property Office dated May 8, 2019, which corresponds to Chinese Patent Application No. CN201810615644.X and is related to U.S. Appl. No. 16/004,688 with English Translation.

An Office Action mailed by the Chinese Patent Office dated Dec. 24, 2019, which corresponds to Chinese Patent Application No. 201810615644.X and is related to U.S. Appl. No. 16/004,688.

* cited by examiner

MACHINE TOOL

This application is based on and claims the benefit of priority from Japanese Patent Application No. 2017-118404, filed on Jun. 16, 2017, the content of which is incorporated herein by reference.

BACKGROUND OF THE INVENTION

Field of the Invention

The present invention relates to a machine tool such as an injection molding machine.

Related Art

In a conventional machine tool such as an injection molding machine, if the machine tool is operated at high speed, for example, the levelness of a base mounted over a mounting surface via a support may be changed by vibration. Hence, it has been necessary to detect the levelness of the base regularly. Generally, a method of mounting a level and the like on the upper surface of the base has been adopted in order to detect the levelness of the base.

Patent document 1 discloses a method of detecting levelness by providing a level in each of an X direction and a Y direction of a machine tool and adjusting the levelness with a leveling bolt.

Patent Document 1: Japanese Unexamined Patent Application, Publication No. 2004-345005

SUMMARY OF THE INVENTION

For adjustment of levelness using such a method, it has been required to grasp values at all levels completely. In the case of a large-scale machine tool, however, a problem has arisen that it takes time for a worker to move each time the worker is to check a value at each level, for example. A different conceivable problem is that, even if measured values are displayed together on a single display, it is difficult to grasp a direction of tilt of the machine tool intuitively. Hence, it has been desired to provide a machine tool allowing a worker to intuitively understand attitude accuracy information about a base such as levelness, gradient, or verticality on a display using a simple method having advantage in terms of running cost.

The present invention is intended to provide a machine tool allowing a worker to intuitively understand attitude accuracy information about a base such as levelness, gradient, or verticality on a display using a simple method having advantage in terms of running cost.

(1) A machine tool according to the present invention (injection molding machine 1 described later, for example) comprises: a measurement unit (measurement unit 6 described later, for example) that measures a measured value; a calculation unit (calculation unit 8 described later, for example) that calculates attitude accuracy information about the machine tool based on the measured value measured by the measurement unit; and a display (display 13 described later, for example) that displays the attitude accuracy information calculated by the calculation unit together with an overhead view of the machine tool.

(2) In the machine tool described in (1), the calculation unit may calculate at least one of levelness, gradient, and verticality as the attitude accuracy information.

(3) In the machine tool described in (1) or (2), the display may display a figure illustrating a bubble level.

(4) The machine tool described in any one of (1) to (3) may further comprise a determination unit (determination unit 9 described later, for example) that determines acceptability as to whether the attitude accuracy information is within a predetermined acceptable range. The display may display a predetermined display target in a mode differing in response to the acceptability determined by the determination unit.

(5) In the machine tool described in (4), the display may display, as means for producing the differing mode, at least one of the type of a character indicating the attitude accuracy information and the type of a figure illustrating a bubble level.

(6) The machine tool described in any one of (1) to (5) may further comprise: a sound generation unit (sound generation unit 14 described later, for example) that generates sound; and a sound control unit (sound control unit 11 described later, for example) that changes at least one type of sound to be generated by the sound generation unit based on the attitude accuracy information calculated by the calculation unit.

(7) In the machine tool described in any one of (1) to (6), the display may display at least one side view of the machine tool.

(8) In the machine tool described in any one of (1) to (7), the machine tool may be an injection molding machine.

(9) In the machine tool described in (8), the display may display both levelness in a direction (AX) parallel to an injection axis and levelness in a direction perpendicular to the injection axis.

(10) In the machine tool described in (8) or (9), the display may display an overhead view or a side view of only one of an injection unit (injection unit 2 described later, for example) and a clamping unit (clamping unit 3 described later, for example).

A machine tool provided by the present invention allows a worker to intuitively understand the levelness, gradient, or verticality of a base on a single display using a simple method having advantage in terms of running cost.

DETAILED DESCRIPTION OF THE INVENTION

Figure 1:
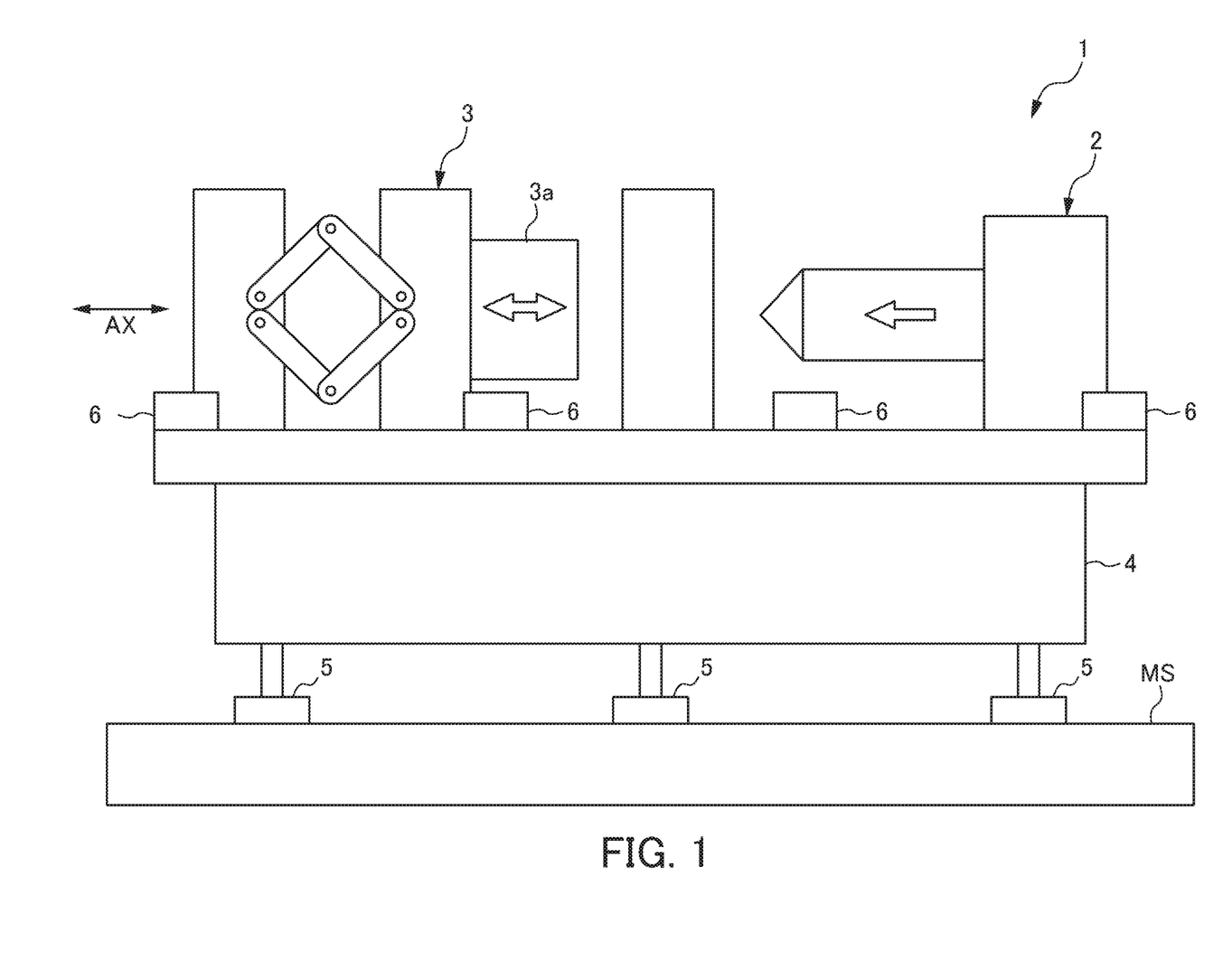
FIG. 1 shows an injection molding machine in outline according to an embodiment of the present invention.
Figure 2:
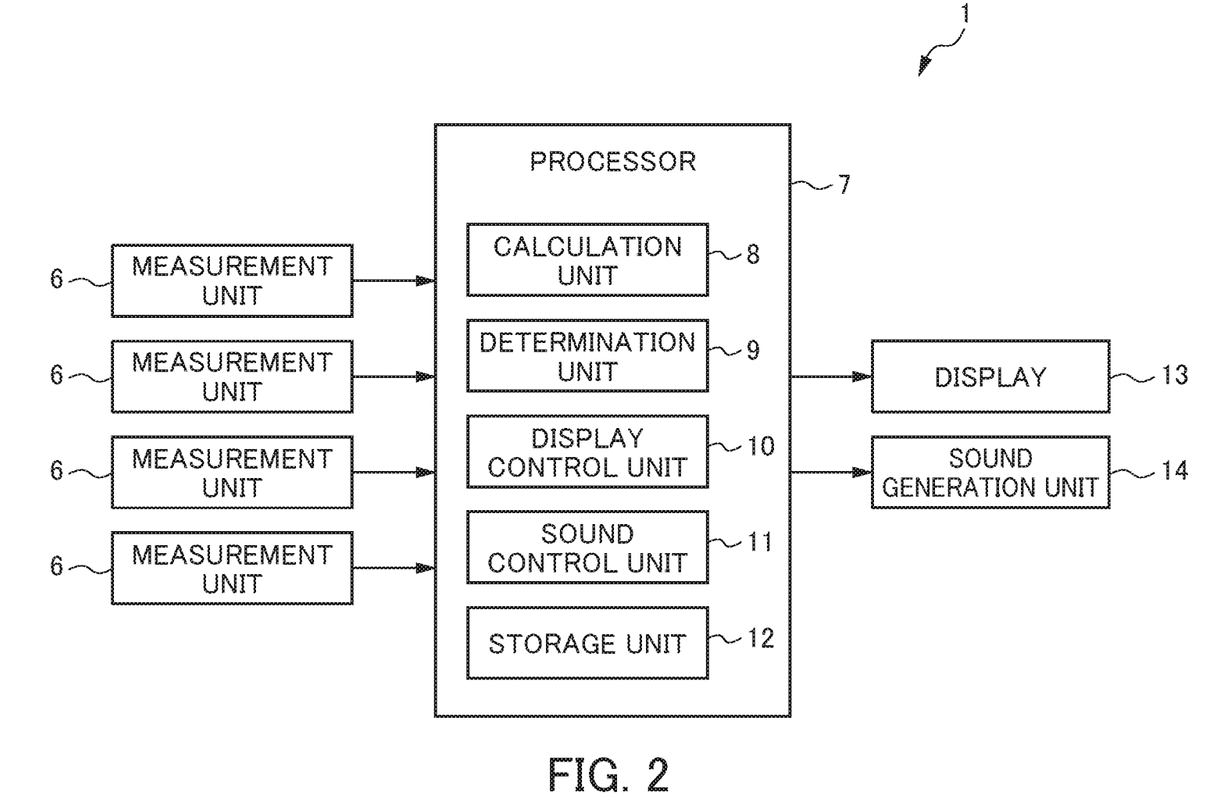
FIG. 2 is a block diagram showing the functional configuration of the injection molding machine.
Figure 3:
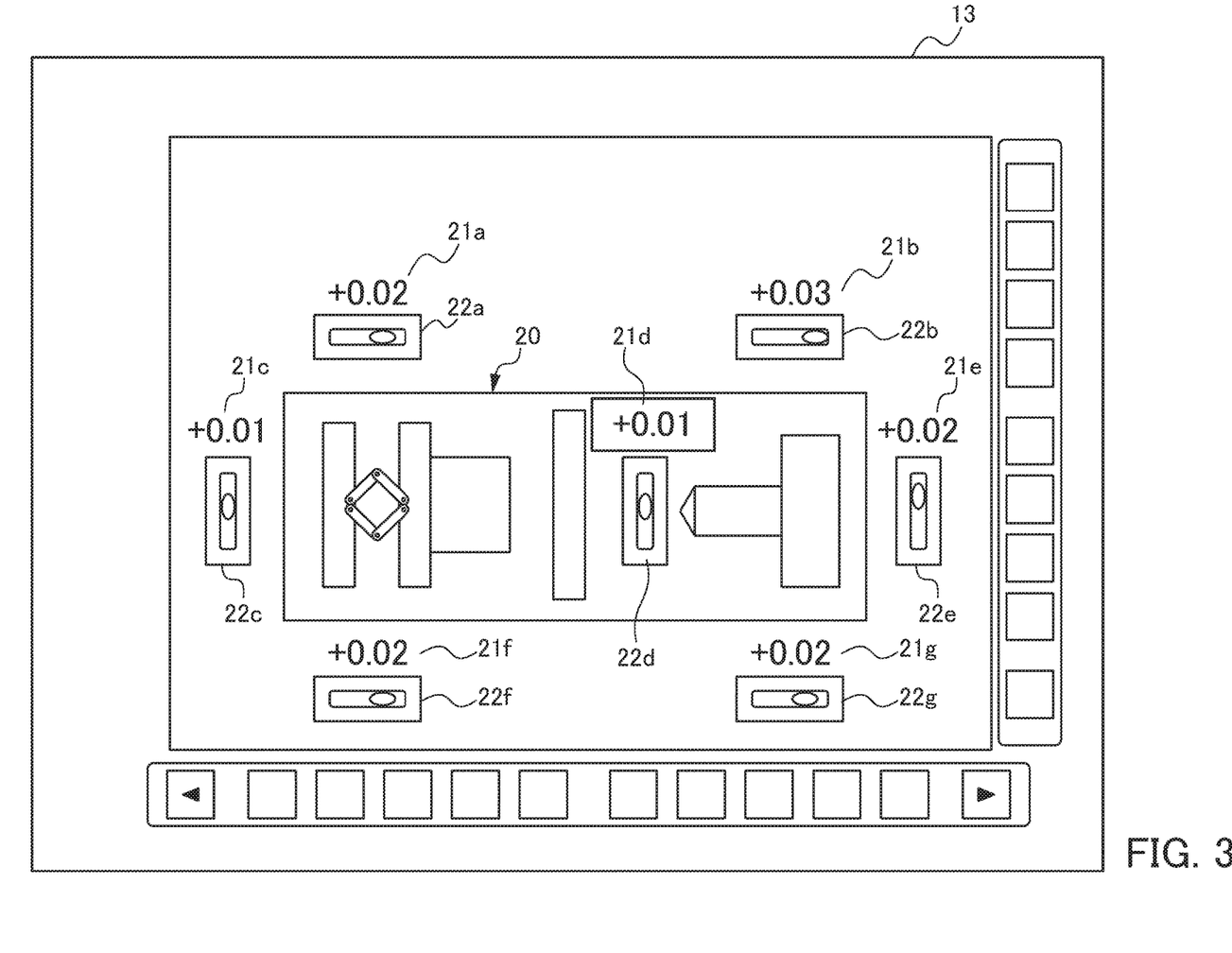
FIG. 3 shows a first display mode of a display in outline.
Figure 4:
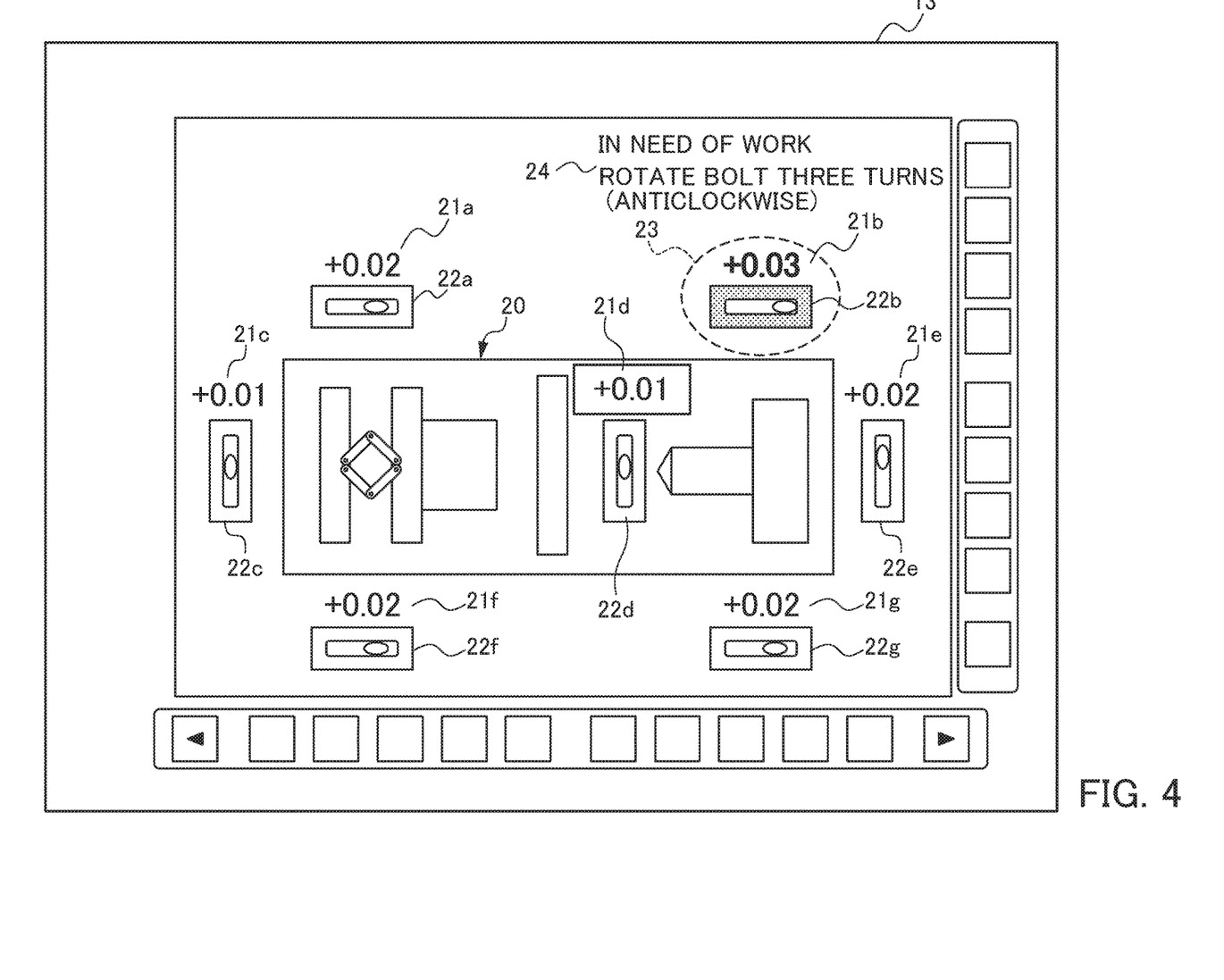
FIG. 4 shows a second display mode of the display in outline.
Figure 5:
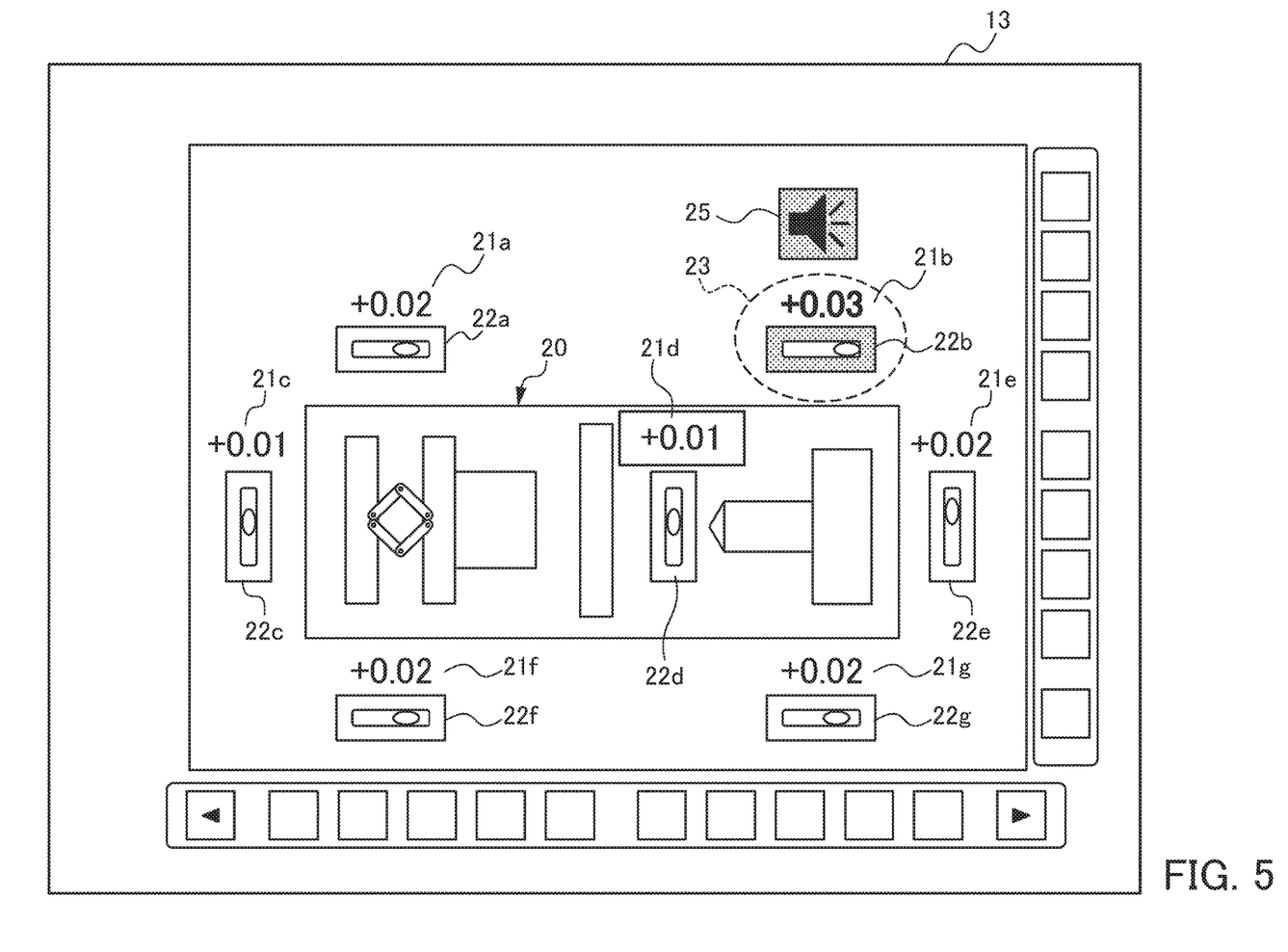
FIG. 5 shows a third display mode of the display in outline.
Figure 6:
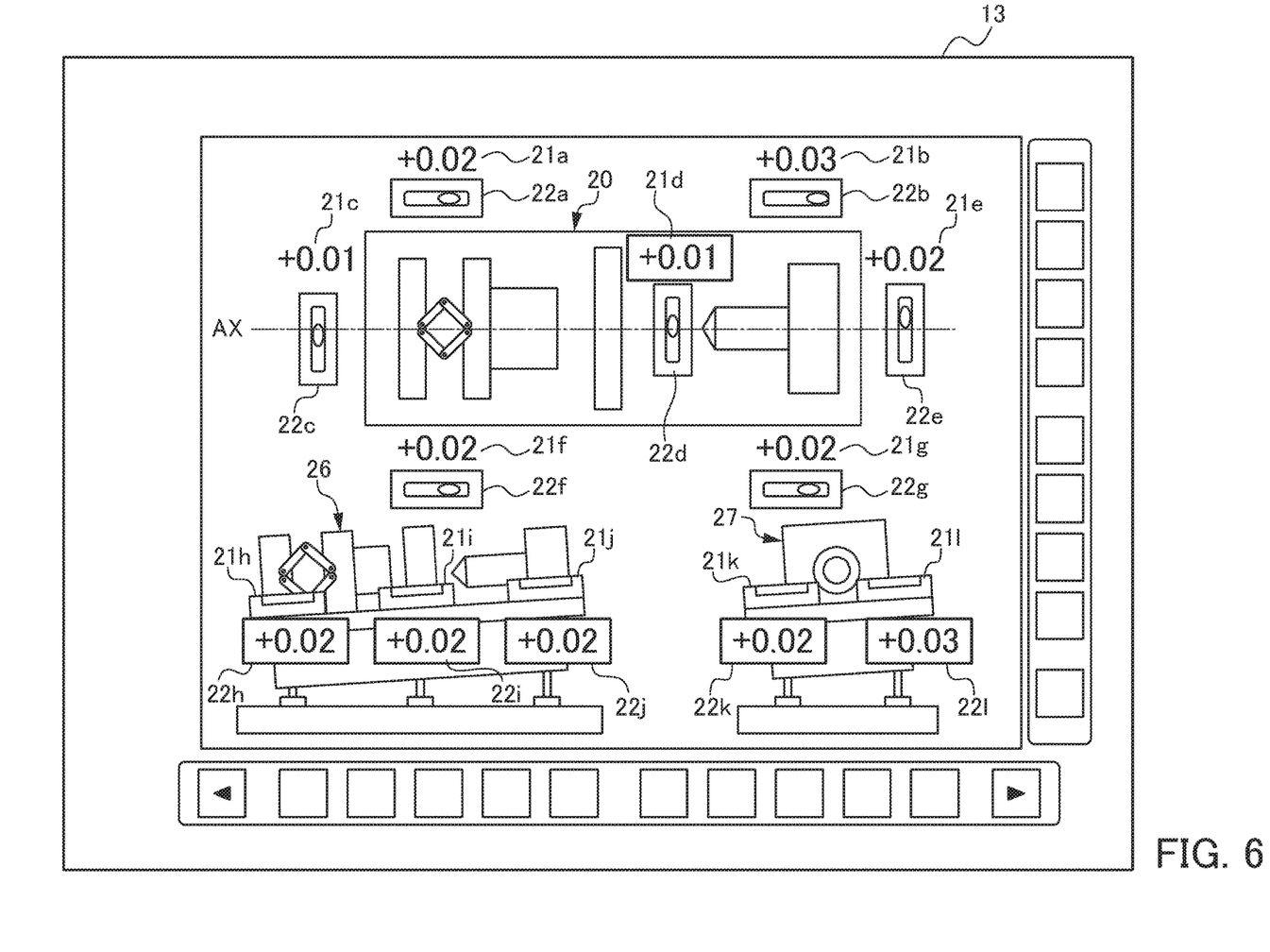
FIG. 6 shows a fourth display mode of the display in outline.
Figure 7:
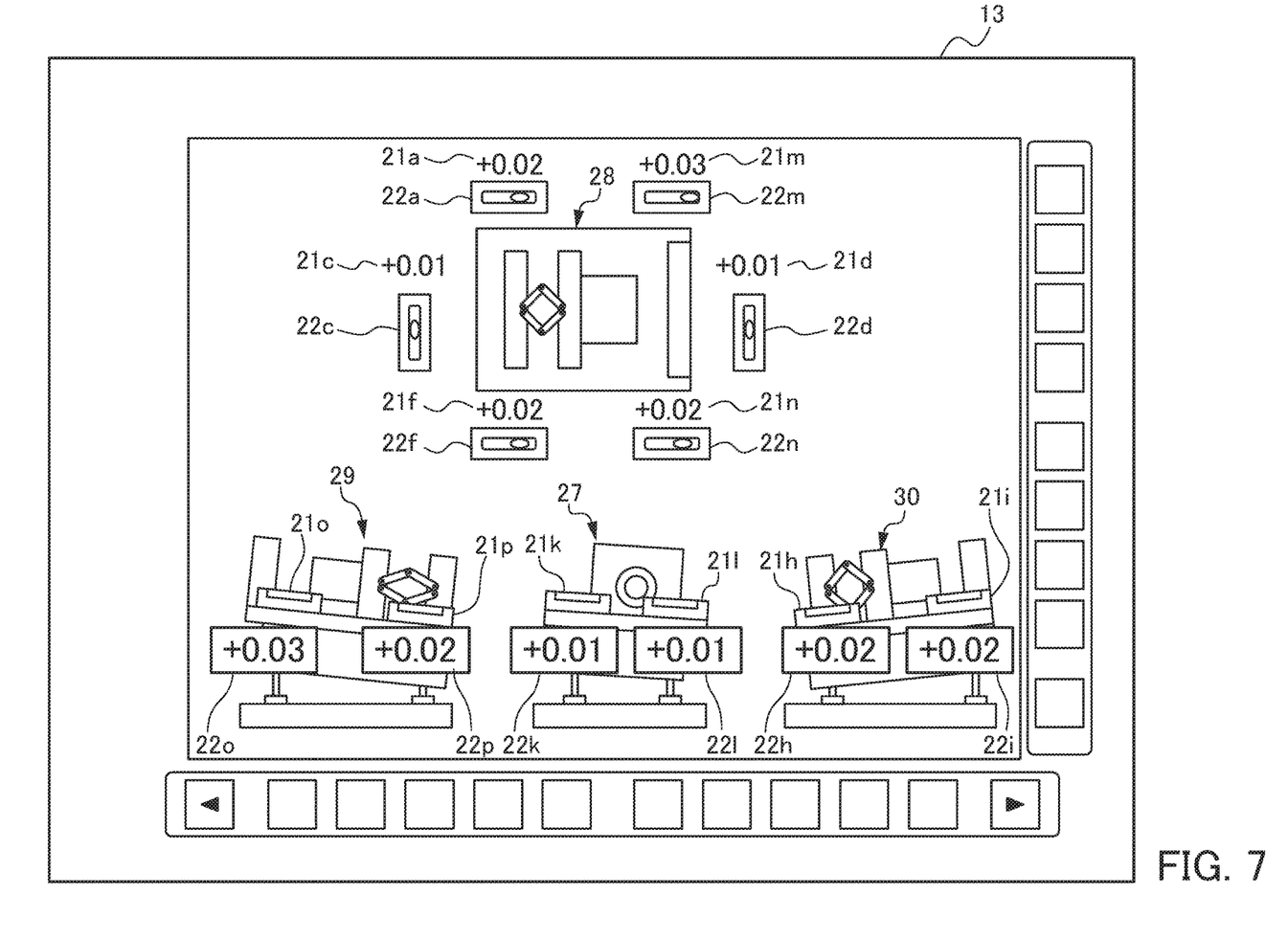
FIG. 7 shows a fifth display mode of the display in outline.

An injection molding machine as an embodiment of a machine tool according to the present invention will be described below in detail by referring to the drawings. FIG. 1 shows an injection molding machine 1 in outline according to the embodiment of the present invention. FIG. 2 is a block diagram showing the functional configuration of the injection molding machine 1. FIG. 3 shows a first display mode of a display 13 in outline. FIG. 4 shows a second display mode of the display 13 in outline. FIG. 5 shows a third display mode of the display 13 in outline. FIG. 6 shows a fourth display mode of the display 13 in outline. FIG. 7 shows a fifth display mode of the display 13 in outline.

[Overall Configuration]

As shown in FIG. 1, the injection molding machine 1 of this embodiment is a machine tool that produces parts by injecting molten resin into a mold 3a and by clamping. More specifically, the injection molding machine 1 includes: an injection unit 2; a clamping unit 3 including the mold 3; a base 4; a mount 5; multiple measurement units 6; a processor 7 (see FIG. 2) with a calculation unit 8 (see FIG. 2), a determination unit 9 (see FIG. 2), a display control unit 10 (see FIG. 2), a sound control unit 11 (see FIG. 2), and a storage unit 12 (see FIG. 2); a display 13 (see FIG. 2); and a sound generation unit 14 (see FIG. 2).

The injection unit 2 and the clamping unit 3 are mounted on the base 4. The base 4 is mounted over a mounting surface MS such as a metal sheet via the mount 5 so as to be capable of vibrating relative to the mounting surface MS. The mount 5 is a support placed between the mounting surface MS and the base 4. The mount 5 has impact absorption property for absorbing impact occurring if the mold 3a is opened and closed at high speed or if resin is filled into the mold 3a at high speed.

The multiple measurement units 6 measure the levelness of the base 4 (specifically, of the injection molding machine 1) as predetermined measured values. The measured values measured by the multiple measurement units 6 are output as signals constantly or so as to coincide with predetermining timing, and then input to the calculation unit 8 (see FIG. 2) forming a part of the processor 7 (see FIG. 2).

As shown in FIG. 2, the processor 7 includes the calculation unit 8, the determination unit 9, the display control unit 10, and the sound control unit 11.

The calculation unit 8 calculates levelness as attitude accuracy information about the base 4 (specifically, about the injection molding machine 1) based on measured values measured by the multiple measurement units 6. The attitude accuracy information calculated by the calculation unit 8 is output as a signal constantly or so as to coincide with predetermining timing, and then input to the determination unit 9, the display control unit 10, and the sound control unit 11.

The determination unit 9 determines acceptability as to whether the levelness as the attitude accuracy information is within a predetermined acceptable range based on the attitude accuracy information calculated by the calculation unit 8 and information about the acceptable range stored in the storage unit 12. The acceptability determined by the determination unit 9 is output as a signal constantly or so as to coincide with predetermined timing, and then input to the display control unit 10 and the sound control unit 11.

The display control unit 10 controls the display 13 based on the attitude accuracy information calculated by the calculation unit 8, the acceptability determined by the determination unit 9, and information about a drawing stored in the storage unit 12.

The sound control unit 11 controls the sound generation unit 14 based on the attitude accuracy information calculated by the calculation unit 8, the acceptability determined by the determination unit 9, and information about sound stored in the storage unit 12. More specifically, the sound control unit 11 changes at least one type of sound to be generated by the sound generation unit 14 based on the attitude accuracy information calculated by the calculation unit 8 and the acceptability determined by the determination unit 9. The type of sound may be the loudness of sound or the frequency of the sound, for example.

The storage unit 12 stores information about an acceptable range used for the determination by the determination unit 9, information about a drawing to be displayed on the display 13, information about sound to be generated by the sound generation unit 14, etc. The information stored in the storage unit 12 is output as a signal so as to coincide with predetermining timing, and then input to the display control unit 10 and the sound control unit 11.

The display 13 displays the attitude accuracy information calculated by the calculation unit 8 and a drawing (overhead view) showing the injection molding machine 1 together under control by the display control unit 10, thereby letting a worker grasp the levelness of the base 4 (specifically, of the injection molding machine 1). More specifically, based on the attitude accuracy information calculated by the calculation unit 8 and the acceptability determined by the determination unit 9, the display 13 displays a target to be displayed on the display 13 in a mode differing in response to the acceptability determined by the determination unit 9. The display 13 uses at least one of the type of a character indicating the attitude accuracy information and the type of a figure illustrating a bubble level as means for producing the differing mode. The type of a character may be the color, size, or font of the character indicating the attitude accuracy information, for example. The type of a figure illustrating a bubble level may be the color of the figure, for example.

The sound generation unit 14 generates sound under control by the sound control unit 11, thereby letting the worker grasp the levelness of the base 4 (specifically, the levelness of the injection molding machine 1).

[Display Mode]

Various modes of display by the display 13 in the injection molding machine 1 will be described next. Regarding a second display mode and its subsequent modes, differences from a first display mode are mainly described and a configuration similar to that of the first display mode will be identified by the same sign. Effect comparable to that achieved by the first display mode will not be described.

[First Display Mode]

As shown in FIG. 3, in a first display mode, the display 13 displays an overhead view 20 of the injection molding machine 1 (see FIG. 1). The display 13 further displays attitude accuracy information in the form of numerical values (characters) including 21a, 21b, 21c, 21d, 21e, 21f, and 21g, and corresponding figures illustrating bubble levels including 22a, 22b, 22c, 22d, 22e, 22f, and 22g. A displayed numerical value becomes larger as accuracy becomes lower. More specifically, displayed numerical values include 0 (not shown in the drawings), +0.01, +0.02, and +0.03 (upper limit for display). Regarding a bubble level, as accuracy becomes lower, an ellipse indicating a bubble moves more externally from the center. A position for display of the attitude accuracy information conforms to an actual position, so that it is preferably the same as an actual position of the measurement unit 6 (see FIG. 1). Regarding attitude accuracy information calculated based on multiple measured values measured by the multiple measurement units 6, however, positions for display of such attitude accuracy information may differ from actual positions of the measurement units 6.

The first display mode for the injection molding machine 1 of this embodiment achieves the following effect, for example. For display of the levelness of the injection molding machine 1, the FIGS. 22a to 22g illustrating the bubble levels are displayed. This allows a worker to more intuitively understand the levelness of the injection molding machine 1. Specifically, the worker is allowed to intuitively understand attitude accuracy information about the base 4 such as levelness, gradient, or verticality on the single display 13 using the simple method having advantage in terms of running cost.

[Second Display Mode]

As shown in FIG. 4, in a second display mode, the display 13 displays a predetermined display target in a mode differing in response to acceptability determined by the determination unit 9 (see FIG. 2). More specifically, the display 13 displays the numerical value 21b indicating attitude accuracy information out of a predetermined acceptable range in a character color and the FIG. 22b illustrating a bubble level in a color different from the character colors of the numerical values 21a and 21c to 21g each indicating attitude accuracy information within the predetermined acceptable range and the colors of the FIGS. 22a and 22c to 22g illustrating bubble levels. A numerical value of +0.03 indicating attitude accuracy information means that this attitude accuracy information is "out of the predetermined acceptable range." The display 13 further displays a circle 23 surrounding the numerical value 21b indicating the attitude accuracy information out of the predetermined acceptable range and surrounding the FIG. 22b illustrating a bubble level. The display 13 also displays characters 24 for instructing work to be done in order for the attitude accuracy information to fall within the predetermined acceptable range.

The second display mode for the injection molding machine 1 of this embodiment achieves the following effect, for example. By setting an acceptable range for levelness to be measured by each measurement unit 6, work of adjusting levelness can be done more simply. If a calculated value about levelness is out of the acceptable range, a character size, a character font, a character color, or a figure color is changed, for example. By doing so, deviation from the acceptable range can be understood intuitively. If the calculated value about levelness is out of the acceptable range, the circle 23 surrounding a figure and a character is additionally displayed. This allows an operator to understand information easily. Additionally, the characters 24 for instructing work to be done in order for the levelness to fall within the acceptable range are displayed, so that the levelness is adjusted more simply.

[Third Display Mode]

As shown in FIG. 5, regarding display by the display 13 in a third display mode, the sound generation unit 14 generates buzzer sound to let a worker understand that attitude accuracy information is not within a predetermined acceptable range. The buzzer sound generated by the sound generation unit 14 changes in response to a calculated value calculated by the calculation unit 8 and an acceptable range stored in the storage unit 12. For example, if a calculated value calculated by the calculation unit 8 is large, the pitch of issuing the buzzer sound generated by the sound generation unit 14 is increased. If a calculated value calculated by the calculation unit 8 is out of an acceptable range, the level of the tone of the buzzer sound is changed. In this way, the buzzer sound is designed in terms of a way of deriving understanding by a worker. In this case, the display 13 displays a warning mark 25.

The third display mode for the injection molding machine 1 of this embodiment achieves the following effect, for example. An operator understands levelness in the form of buzzer sound, so that the operator can become free from the work of checking the display 13 visually, for example.

[Fourth Display Mode]

As shown in FIG. 6, in a fourth display mode, the display 13 displays a side view 26 of the injection molding machine 1 as viewed from an operator. The display 13 further displays levelness in a direction parallel to an injection axis AX in the form of numerical values (characters) including 21h, 21i, and 21j and corresponding figures illustrating bubble levels including 22h, 22i, and 22j. The display 13 also displays a side view 27 of the injection molding machine 1 as viewed from the injection unit. The display 13 further displays levelness in a direction perpendicular to the injection axis AX in the form of numerical values (characters) including 21k and 21l and corresponding figures illustrating bubble levels including 22k and 22l.

For adjustment of the levelness of the injection molding machine 1, levelness in the direction parallel to the injection axis AX and levelness in the direction perpendicular to the injection axis AX are important issues. Each of these directions is parallel or perpendicular to a direction in which the injection molding machine 1 is movable. Hence, levelness in each of these directions is to largely affect the performance of a molded article or the lifetime of a part. According to the fourth display mode for the injection molding machine 1 of this embodiment, levelness in the important direction can be understood by an operator. Further, the mount 5 is mounted on each of an operator side and an opposite side of each of the injection unit 2 and the clamping unit 3. Thus, by displaying levelness at at least two places in the direction parallel or perpendicular to the injection axis AX, the mount 5 to be adjusted is selected easily. The operator sees the injection molding machine 1 from a side surface of the injection molding machine 1. Thus, displaying the side views 26 and 27 on the display 13 allows the operator to more intuitively understand which mount 5 is to be adjusted in height.

[Fifth Display Mode]

As shown in FIG. 7, in a fifth display mode, the display 13 displays an overhead view 28 of the clamping unit 3 (see FIG. 1) as a part of the injection molding machine 1 (see FIG. 1), a side view 29 of the clamping unit 3 as viewed from an opposite side of an operator, a side view 27 of the clamping unit 3, and a side view 30 of the clamping unit 3 as viewed from the operator.

In the injection molding machine 1, the clamping unit 3 is largely vibrated by opening and closing of the mold 3a at high speed, for example. Further, the injection unit 2 is largely vibrated by filling with resin at high speed, for example. Hence, levelness is expected to be changed largely at only one of the clamping unit 3 and the injection unit 2 by an operating condition. According to the fifth display mode for the injection molding machine 1 of this embodiment, the levelness only of the clamping unit 3 is displayed in detail. Thus, change in levelness occurring during operation can be handled more easily.

Regarding an injection molding machine as one of machine tools, the injection molding machine itself is likely to be vibrated by opening and closing of a mold at high speed or filling with resin at high speed, for example. In response to this, the mount 5 made of rubber for impact absorption is mounted in many cases between the injection molding machine 1 and the mounting surface MS. In this injection molding machine 1, the levelness of the base 4 may be changed by aging degradation of the mount 5 resulting from absorption of impact caused by the vibration of the injection molding machine or by deformation of the mounting surface MS itself. Hence, in the injection molding machine 1, the levelness of the base 4 should be detected regularly.

Conventionally, the levelness of an injection molding machine has been checked using a level mounted on the upper surface of a base or that of a mechanism unit. For check of the levelness, the injection molding machine has been required to be stopped. In the case of a large-scale injection molding machine, the injection molding machine has been required to be moved to a predetermined position for mounting of the level. This has caused a problem of increasing the downtime of the injection molding machine. In particular, in the injection molding machine, a clamping unit is vibrated by opening and closing of a mold, for example. Meanwhile, an injection unit is vibrated by filling with resin, for example. This necessitates check of the levelness of each of the clamping unit and the injection unit and increases the number of levels. Further, even if measured values about levelness are expected to be displayed together on a display with the intention of reducing burden of move on a worker, a problem still arises that it is difficult to know a relationship at a glance between a measured value and a position in a machine tool having levelness indicated by this measured value.

By contrast, in the injection molding machine 1 of this embodiment, levelness is displayed so as to conform to an actual position on the display 13 together with the overhead view 20 of the injection molding machine 1. This allows a worker to intuitively understand the levelness of the injection molding machine 1.

[Modifications]

As above, the embodiment of the present invention has been described, however, the present invention is not limited to the embodiment described above. The effects described in the embodiment are merely a list of most preferable effects resulting from the present invention. Effects achieved by the present invention are not limited to those described in the embodiment.

In the foregoing embodiment, (only) levelness is used as attitude accuracy information about the base 4 (specifically, about the injection molding machine 1). However, this is not the only case. At least one of the levelness, gradient, and verticality of the base 4 (specifically, of the injection molding machine 1) is usable as the attitude accuracy information.

In the foregoing embodiment, a numerical value indicating attitude accuracy information out of a predetermined acceptable range is displayed in a character color and a corresponding figure illustrating a bubble level is displayed in a color different from the character color of a numerical value indicating attitude accuracy information within the predetermined acceptable range and the color of a corresponding figure. However, this is not the only case. Attitude accuracy information out of the predetermined acceptable range can be displayed in a mode differing in at least one of the color, size, and font of a character indicating the attitude accuracy information, and the color of a corresponding figure illustrating a bubble level.

In the foregoing embodiment, multiple side views are displayed in each of the fourth display mode and the fifth display mode. However, this is not the only case. Only one side view of the injection molding machine 1 may be displayed. In the foregoing embodiment, the overhead view 28, and the side views 27, 29, and 30 displayed in the fifth display mode are only of the clamping unit 3. However, this is not the only case. A view to be displayed may be an overhead view or a side view of only one of the injection unit 2 and the clamping unit 3. The machine tool of the present invention is not limited to the injection molding machine.

EXPLANATION OF REFERENCE NUMERALS

1 Injection molding machine (machine tool)
2 Injection unit
3 Clamping unit
3*a* Mold
4 Base
5 Mount
6 Measurement unit
7 Processor
8 Calculation unit
9 Determination unit
10 Display control unit
11 Sound control unit
12 Storage unit
13 Display
14 Sound generation unit
20, 28 Overhead view
21*a*, 21*b*, 21*c*, 21*d*, 21*e*, 21*f*, 21*g*, 21*h*, 21*i*, 21*j*, 21*k*, 21*l*, 21*m*, 21*n*, 21*o*, 21*p* Numerical value (character)
22*a*, 22*b*, 22*c*, 22*d*, 22*e*, 22*f*, 22*g*, 22*h*, 22*i*, 22*j*, 22*k*, 22*l*, 22*m*, 22*n*, 22*o*, 22*p* Figure illustrating bubble level
23 Circle
24 Character
25 Warning mark
26, 27, 29, 30 Side view
MS Mounting surface
AX Injection axis

What is claimed is:

1. A machine tool comprising:
    a plurality of measurement units that each measures a measured value;
    a calculation unit that calculates each of pieces of attitude accuracy information about a base of the machine tool based on each of the measured values; and
    a display that displays the pieces of attitude accuracy information calculated by the calculation unit together with an overhead view of the machine tool,
    wherein
    the calculation unit calculates at least one of levelness, gradient, and verticality as the attitude accuracy information, and
    the attitude accuracy information is displayed at a position which conforms to an actual position on the overhead view of the machine tool or therearound as a figure representing at least a degree of each attitude accuracy.

2. The machine tool according to claim 1, wherein the display displays, as the figure, a figure illustrating a bubble level.

3. The machine tool according to claim 1, further comprising a determination unit that determines acceptability as to whether the attitude accuracy information is within a predetermined acceptable range, wherein
    the display displays a predetermined display target in a mode differing in response to the acceptability determined by the determination unit.

4. The machine tool according to claim 3, wherein the display displays, as means for producing the differing mode, at least one of a type of a character indicating the attitude accuracy information and a type of a figure illustrating a bubble level.

5. The machine tool according to claim 1, further comprising:
   a sound generation unit that generates sound; and
   a sound control unit that changes at least one of the loudness of sound and the frequency of sound to be generated by the sound generation unit based on the attitude accuracy information calculated by the calculation unit.

6. The machine tool according to claim 1, wherein the display displays at least a side view of the machine tool.

7. The machine tool according to claim 1, wherein the machine tool is an injection molding machine.

8. The machine tool according to claim 7, wherein the display displays both the levelness in a direction parallel to an injection axis and the levelness in a direction perpendicular to the injection axis.

9. The machine tool according to claim 7, wherein the display displays an overhead view or a side view of only one of an injection unit and a clamping unit.

* * * * *